C. T. BEEBE.
Craw-Socket for Scythe-Fastening.

No. 201,218. Patented March 12, 1878.

Witnesses:
C. L. Walcott.
E. A. Walcott.

Inventor:
Calvin T. Beebe
Per Geo D. Walcott
Atty.

UNITED STATES PATENT OFFICE.

CALVIN T. BEEBE, OF JACKSON, MICHIGAN, ASSIGNOR TO WITHINGTON & COOLEY MANUFACTURING COMPANY, OF SAME PLACE.

IMPROVEMENT IN CRAW-SOCKETS FOR SCYTHE-FASTENINGS.

Specification forming part of Letters Patent No. 201,218, dated March 12, 1878; application filed January 19, 1878.

*To all whom it may concern:*

Be it known that I, CALVIN T. BEEBE, of the city of Jackson, county of Jackson, and State of Michigan, have invented a new and useful Improvement in Craw-Sockets for Scythe-Fastenings, of which the following is a specification:

The object of my invention is to provide a craw-socket that may be adjusted to any point between the extremes of its range and there firmly held, as shown by accompanying specification and drawings.

Figure 1:
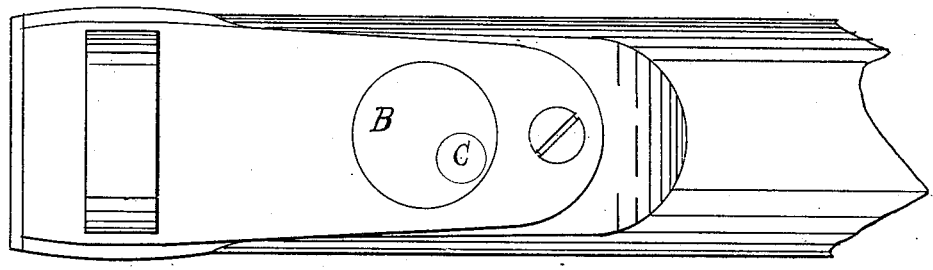
Figure 2:
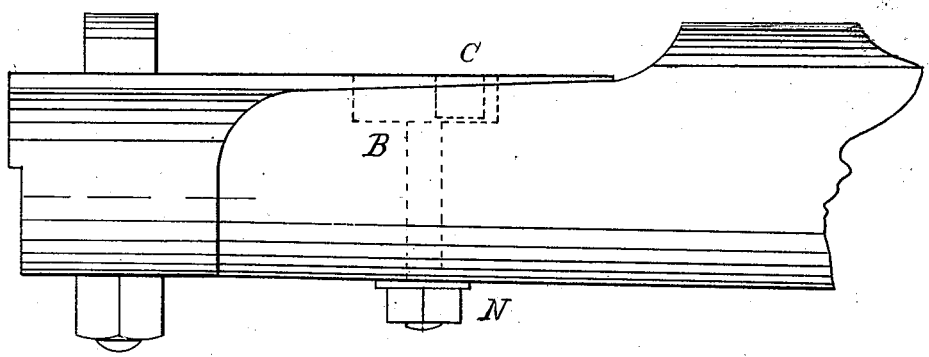
Figure 3:
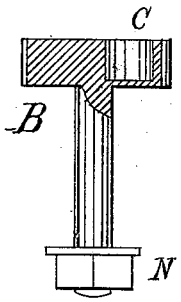
Figure 4:
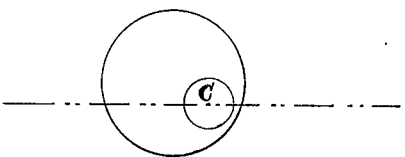

The invention is illustrated fully by the drawings, Figures 1 and 2 showing the parts as attached to snath-stick. Figs. 3 and 4 show the craw-socket and bolt-head, into which it is cut, separate from other parts.

My invention consists of a bolt with a head of such size and shape as will allow a craw-socket to be formed in its top, said socket being placed off from the center line of the shank of the bolt, in such manner as that, when turning the bolt, the socket will revolve in a circle, the radius of which is the distance the center of socket is from center line of bolt.

The heel-plate is made with a hole of same size of bolt-head, and the snath-stick is counterbored to receive the bolt-head after passing through the plate, and also bored to receive the shank of bolt. The friction caused by drawing the bolt-head into the seat thus formed for it by means of the nut N holds it firmly in any desired position.

B indicates the bolt, C the craw-socket, and N the nut on end of bolt for holding bolt in position, in each figure of drawings.

I claim as my invention—

1. The bolt with craw-socket formed in its head, as and for the purpose shown and described.

2. The combination of bolt and socket with heel-plate, as shown and described.

CALVIN T. BEEBE.

Witnesses:
S. D. WELLING,
ERASTUS PECK.